United States Patent
Hochstein et al.

(10) Patent No.: US 8,622,074 B2
(45) Date of Patent: Jan. 7, 2014

(54) FUEL TANK VENTING SYSTEM

(75) Inventors: Andrej Hochstein, Karlsruhe (DE);
Bernd M. Nickel, Karlsruhe (DE);
Martin Stickel, Muggensturm (DE)

(73) Assignee: TI Automotive Technology Center GmbH, Rastatt (DE)

( * ) Notice: Subject to any disclaimer, the term of this patent is extended or adjusted under 35 U.S.C. 154(b) by 170 days.

(21) Appl. No.: 13/359,191

(22) Filed: Jan. 26, 2012

(65) Prior Publication Data
US 2013/0192703 A1    Aug. 1, 2013

(51) Int. Cl.
*B60K 15/035* (2006.01)
*F16K 31/18* (2006.01)

(52) U.S. Cl.
USPC ............ 137/202; 137/578; 137/587; 220/746

(58) Field of Classification Search
USPC ................. 137/38, 39, 43, 44, 202, 578, 587;
220/746; 123/516
See application file for complete search history.

(56) References Cited

U.S. PATENT DOCUMENTS

| | | | | |
|---|---|---|---|---|
| 3,672,537 A | * | 6/1972 | Kitzner ........................ | 220/746 |
| 3,967,633 A | * | 7/1976 | Hallanger et al. ............ | 137/578 |
| 4,261,477 A | * | 4/1981 | Casimir et al. ................ | 220/746 |
| 4,836,402 A | * | 6/1989 | Sasaki ........................... | 220/746 |
| 6,276,387 B1 | * | 8/2001 | Pachciarz et al. ............. | 137/587 |
| 6,302,137 B1 | * | 10/2001 | Devall ........................... | 137/587 |
| 6,655,403 B2 | * | 12/2003 | Mills ............................. | 137/587 |
| 6,951,209 B2 | * | 10/2005 | Yanase et al. ................. | 137/587 |
| 7,520,293 B2 | * | 4/2009 | Hilderley et al. ............. | 137/578 |
| 2001/0011538 A1 | | 8/2001 | Crary et al. | |
| 2005/0172999 A1 | | 8/2005 | Ohshiro et al. | |
| 2007/0000542 A1 | | 1/2007 | Johansen | |
| 2009/0236350 A1 | | 9/2009 | Miura | |

FOREIGN PATENT DOCUMENTS

| | | |
|---|---|---|
| DE | 102007042278 A1 | 3/2009 |
| EP | 1470944 A1 | 10/2004 |
| WO | WO2005042291 A2 | 5/2005 |

OTHER PUBLICATIONS

EP Extended Search Report, Apr. 17, 2013, 4 pages.

* cited by examiner

*Primary Examiner* — John Rivell
(74) *Attorney, Agent, or Firm* — Reising Ethington P.C.

(57) ABSTRACT

A venting system for a fuel tank may include a first vent valve having an inlet, an outlet through which fuel vapor may be vented from the fuel tank, and a valve. The first vent valve may be located within a first chamber of the fuel tank. A second vent valve may have an inlet, an outlet through which fuel vapor may be vented from the fuel tank, and a valve. The second vent valve may be located within a second chamber of the fuel tank that is separate from the first chamber during at least certain fuel levels within the fuel tank. The support may carry both the first and second vent valves within the fuel tank and be movably carried within the fuel tank to vary the height of the first and second valves within the fuel tank as the support moves relative to the fuel tank.

19 Claims, 3 Drawing Sheets

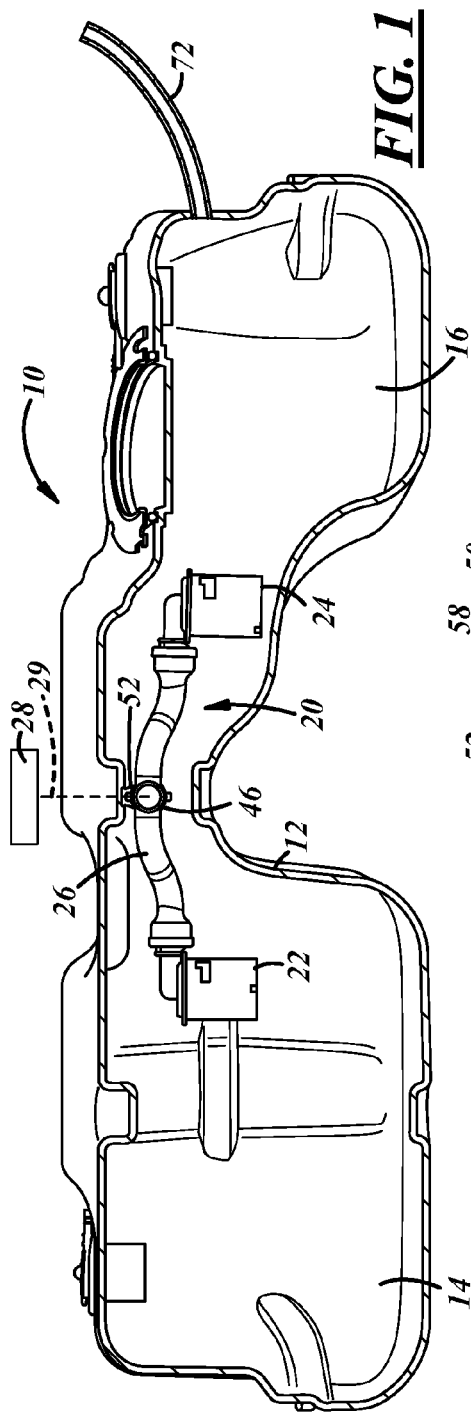
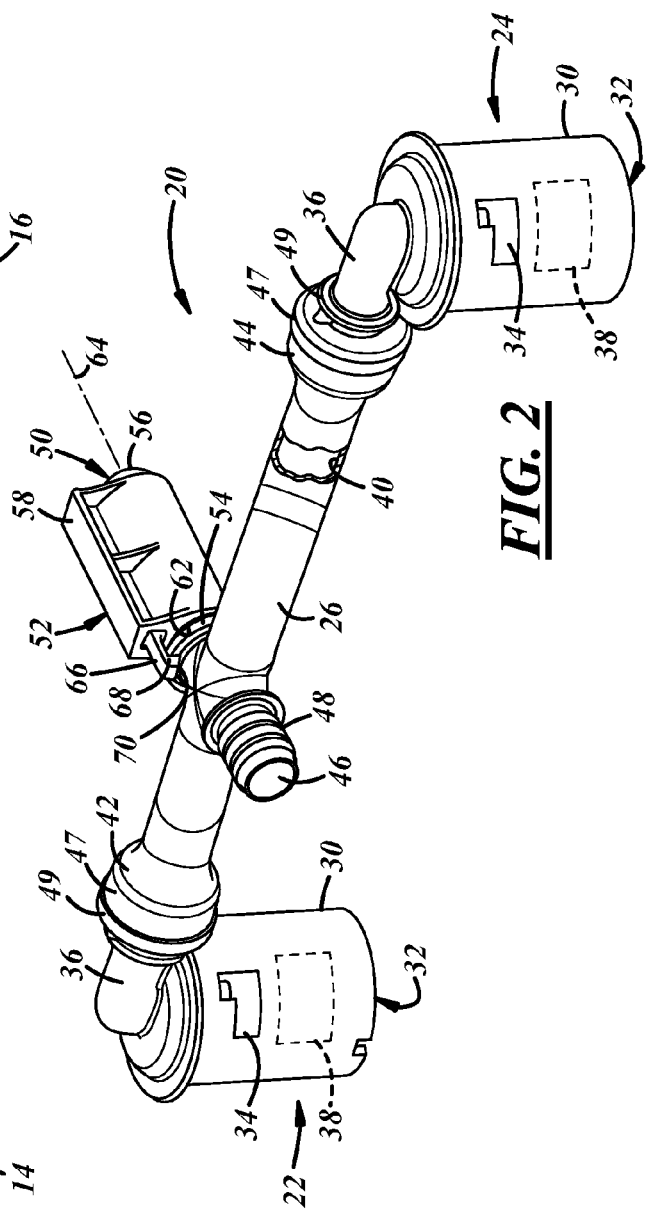

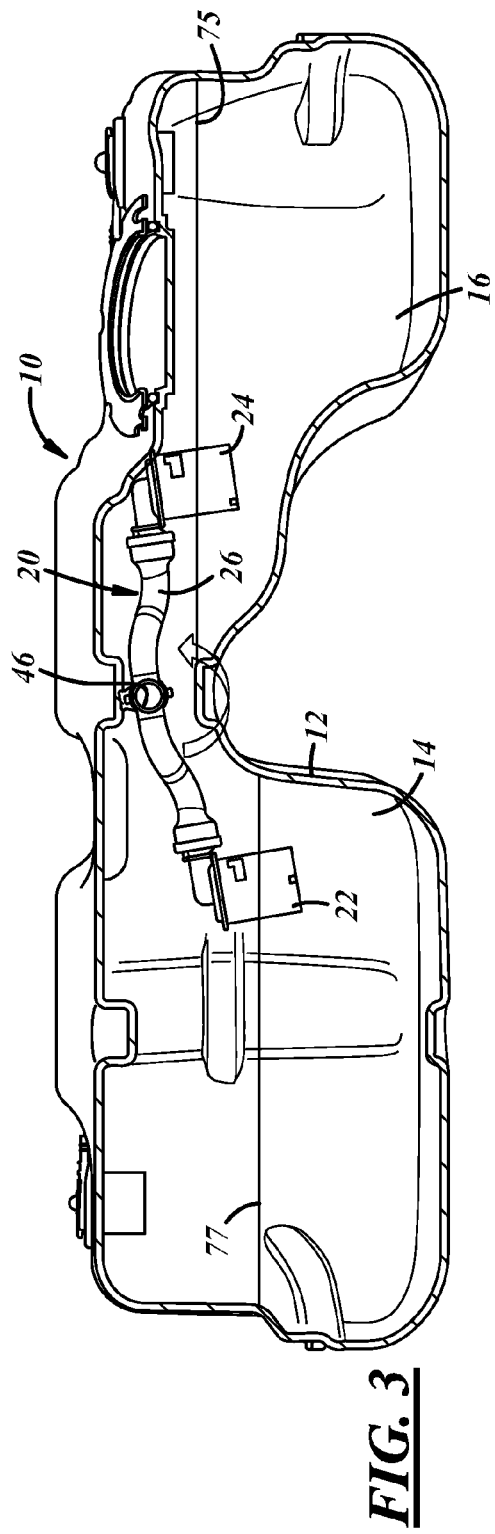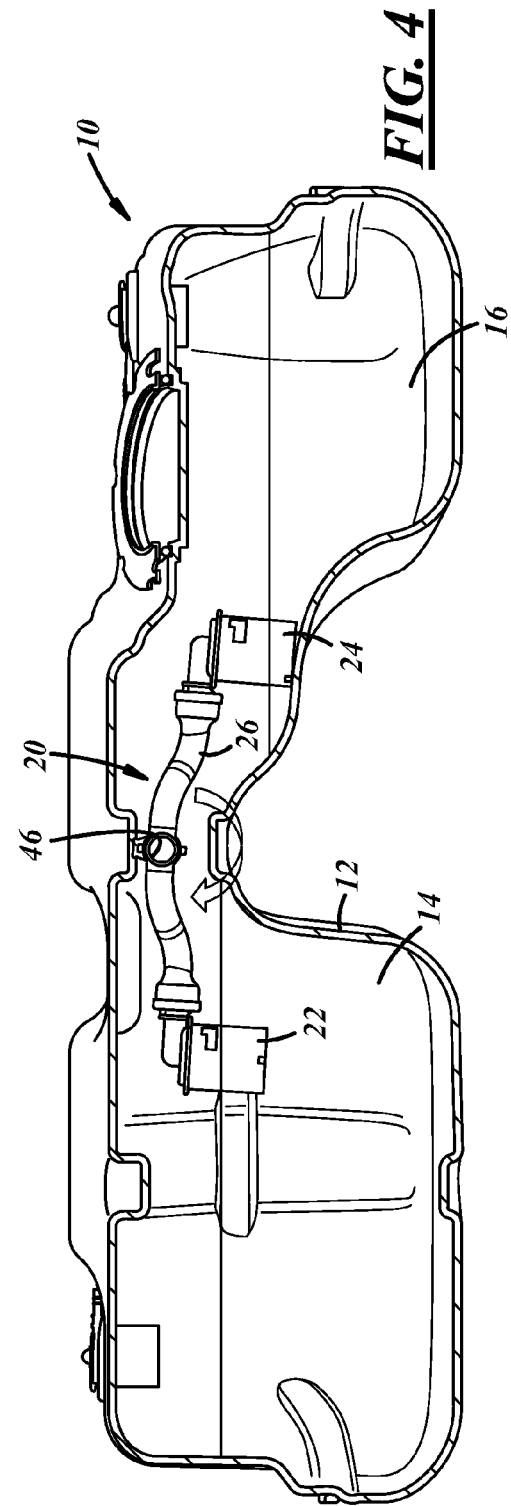

FUEL TANK VENTING SYSTEM

TECHNICAL FIELD

The present disclosure relates generally to a vapor venting arrangement for a tank.

BACKGROUND

Fuel tanks for vehicles may include one or more vent valves through which fuel vapor may be communicated with a vapor canister that removes hydrocarbons from fuel vapor and/or routes fuel vapor to an engine for combustion in the engine. The vent valve(s) may also control the level to which fuel may be added to a fuel tank during a refilling event.

SUMMARY

In at least one form, a venting system for a fuel tank may include a first vent valve, a second vent valve and a support. The first vent valve may be responsive to the level of liquid fuel in the fuel tank to prevent fuel vapor in the fuel tank from venting through the first vent valve when the level of liquid fuel in the fuel tank causes the first vent valve to close, and the first vent valve may be located within a first chamber of the fuel tank. The second vent valve may be responsive to the level of liquid fuel in the fuel tank to prevent fuel vapor in the fuel tank from venting through the second vent valve when the level of liquid fuel in the fuel tank causes the second vent valve to close. The second vent valve may be located within a second chamber of the fuel tank that is separate from the first chamber of the fuel tank during at least certain fuel level conditions within the fuel tank. The support may have a passage communicated with the first vent valve and the second vent valve that receives vapor that flows through the first vent valve and second vent valve. The support may carry both the first and second vent valves within the fuel tank and be movably carried within the fuel tank to vary the height of the first and second valves within the fuel tank.

In at least one form, a venting system for a fuel tank may include a first vent valve, a second vent valve and a support. The first vent valve may have an inlet through which fuel vapor may enter, an outlet through which fuel vapor may be vented from the fuel tank, and a liquid responsive valve that prevents fuel vapor from venting out of the outlet when the level of liquid fuel in the fuel tank causes the liquid responsive valve to close. The first vent valve may be located within a first chamber of the fuel tank. The second vent valve may have an inlet through which fuel vapor may enter, an outlet through which fuel vapor may be vented from the fuel tank, and a liquid responsive valve that prevents fuel vapor from venting out of the outlet when the level of liquid fuel in the fuel tank causes the liquid responsive valve to close. The second vent valve may be located within a second chamber of the fuel tank that is separate from the first chamber of the fuel tank during at least certain fuel level conditions within the fuel tank. The support may have a first inlet communicated with the outlet of the first vent valve, a second inlet communicated with the outlet of the second vent valve and an outlet through which fuel vapor vented from the outlet of one or both of the first and second vent valves may flow. The support may carry both the first and second vent valves within the fuel tank and be movably carried within the fuel tank to vary the height of the first and second valves within the fuel tank.

A fuel tank assembly may include a fuel tank, a first vent valve, a second vent valve and a support. The fuel tank may include a first chamber, a second chamber and a tank wall separating the first chamber from the second chamber during at least certain levels of fuel within the fuel tank. The first vent valve may have an inlet through which fuel vapor may enter, an outlet through which fuel vapor may be vented from the fuel tank, and a liquid responsive valve that prevents fuel vapor from venting out of the outlet when the level of liquid fuel in the fuel tank causes the liquid responsive valve to close, the first vent valve being located within the first chamber of the fuel tank. The second vent valve may have an inlet through which fuel vapor may enter, an outlet through which fuel vapor may be vented from the fuel tank, and a liquid responsive valve that prevents fuel vapor from venting out of the outlet when the level of liquid fuel in the fuel tank causes the liquid responsive valve to close, the second vent valve being located within the second chamber of the fuel tank. The support may have a first inlet communicated with the outlet of the first vent valve, a second inlet communicated with the outlet of the second vent valve and an outlet through which fuel vapor vented from the outlet of one or both of the first and second vent valves may flow. The support may carry both the first and second vent valves within the fuel tank and be movably carried within the fuel tank to vary the height of the first and second valves within the fuel tank.

A venting system for a fuel tank may include a first vent valve, a second vent valve and a support. The first vent valve may have an inlet through which fuel vapor may enter, an outlet through which fuel vapor may be vented from the fuel tank, and a valve that prevents fuel vapor from venting out of the outlet when the level of liquid fuel in the fuel tank causes the valve to close. The first vent valve may be located within a first chamber of the fuel tank. The second vent valve may have an inlet through which fuel vapor may enter, an outlet through which fuel vapor may be vented from the fuel tank, and a valve that prevents fuel vapor from venting out of the outlet when the level of liquid fuel in the fuel tank causes the valve to close. The second vent valve may be located within a second chamber of the fuel tank that is separate from the first chamber of the fuel tank during at least certain fuel level conditions within the fuel tank. The support may carry both the first and second vent valves within the fuel tank and be carried within the fuel tank for pivoted movement relative to the fuel tank to vary the height of the first and second valves within the fuel tank as the support moves relative to the fuel tank.

BRIEF DESCRIPTION OF THE DRAWINGS

The following detailed description of exemplary embodiments and best mode will be set forth with reference to the accompanying drawings, in which:

FIG. 1 cross sectional view of a fuel tank including one implementation of a venting assembly;

FIG. 2 is a perspective view of the venting assembly;

FIG. 3 is a cross sectional view of the fuel tank like FIG. 1 and showing the venting assembly in a first position;

FIG. 4 is a cross sectional view of the fuel tank like FIG. 1 and showing the venting assembly in a second position.

DETAILED DESCRIPTION OF PRESENTLY PREFERRED EMBODIMENTS

Figure 5:
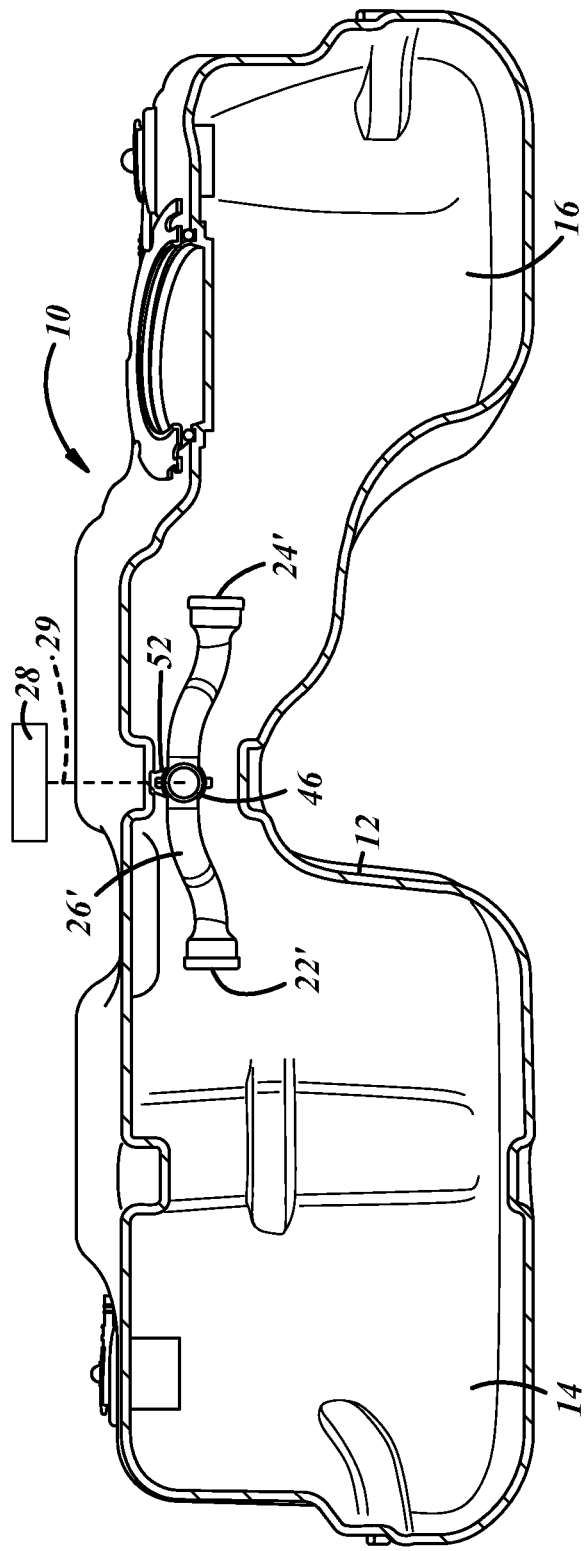
FIG. 5 is a cross sectional view of a fuel tank showing a venting assembly.

Referring in more details to the drawings, FIGS. 1-4 illustrate a fuel tank 10 such as may be used to retain a supply of fuel for a vehicle, like a car, truck, bus, van, SUV, and the like, although other types of tanks and vehicles (boats, motorcycles, ATV's, etc) may be used. Liquid fuel within the fuel tank 10 may be pumped from the tank and delivered under pressure to an engine of the vehicle to support operation of the engine. The fuel tank 10 may be formed of any suitable material (such as plastic and/or metal) and in any suitable way. As shown in FIGS. 1, 3 and 4, the fuel tank 10 may have an internal barrier 12, such as a hump, baffle, wall or other body formed in one-piece with or separately from the tank 10. The internal barrier 12 may define more than one internal volume or section 14, 16 of the fuel tank 10, wherein at least at certain levels of fuel in the tank, the fuel may be divided into one or more of the sections and not generally free to flow between the sections (e.g. when the level of fuel is below the minimum height of the barrier 12). In the implementation shown, the tank is a so-called "saddle tank" where the barrier 12 is a saddle shaped portion of the tank that provides clearance for adjacent components of the vehicle, such as, for example, an exhaust pipe or drive shaft. Of course, other shapes and configurations of the fuel tank 10 may be used.

In addition to liquid fuel, air and fuel vapors may be present within the interior volume of the fuel tank 10. Current governmental regulations limit the emissions of fuel vapor from the fuel tank 10 and/or emissions of hydrocarbons from the vehicle in general. To reduce the emission of hydrocarbon fuel vapors from the tank 10, a venting system 20 may be used. The venting system 20 may include one or more components within the fuel tank 10 and/or one or more components outside of the fuel tank. In the implementation shown, the venting system 20 includes two vent valves 22, 24 interconnected by a support 26, and a vapor canister 28 (FIG. 1) that is communicated with the vent valves 22, 24 to receive fuel vapor that flows from the vent valves. The vapor canister 28 may be located inside or outside of the fuel tank 10, and is shown diagrammatically in FIG. 1 as being outside of the fuel tank. The vapor canister 28 may be of conventional construction and operation. The vent valves 22, 24 may communicate with the vapor canister through one or more vent lines 29 so that fuel vapor may flow from within the tank 10, through the vent valve(s) 22, 24 and to the vapor canister 28 during at least certain fuel level conditions within the fuel tank.

Referring to FIG. 2, the vent valves 22, 24 may each include a housing 30 having a first inlet 32 at a lower end of the housing, a second inlet 34 spaced above the first inlet, an outlet 36 through which gaseous matter (referred to hereafter as fuel vapor) may be vented, and a valve 38 carried by the housing and operable to selectively close the outlet 36. Gaseous matter (e.g. air and fuel vapor) may enter at least the second inlet 34 whereupon it flows through or past the valve 38, when the valve is open, and out of the fuel tank 10 to the vapor canister 28. Liquid fuel may enter the first inlet 32 and, when the level of fuel in the tank 10 is high enough, may close the valve 38 within the housing 30 to prevent further venting through that vent valve 22 or 24. In this way, the valve 38 is responsive to and actuated by liquid fuel to move from an open position to a closed position and provide a mechanical closure of the vent valve. The valve 38 may include a float or buoyant body that is responsive to the level of fuel in the tank at least when a portion of the float is acted upon (e.g. immersed) in liquid fuel. The vent valves 22, 24 may include a baffle or other shield that prevents or inhibits liquid fuel from exiting the valve 38 through the outlet 36 even if liquid fuel enters the vent valve housing 30 through the second inlet 34. The vent valves 22, 24 may function and be constructed as shown in U.S. Patent Application Publication No. 2007/0000542A1, or U.S. Patent Application Publication No. 2001/0011538A1, the disclosure of which is incorporated herein, by reference, in its entirety. Of course, the vent valves 22, 24 could be constructed in a different manner, and more than two vent valves may be used.

The vent valves 22, 24 may be mounted within the tank by the support 26. The support 26 may include a body 39 having main passage 40 through which the vent valves 22, 24 communicate with each other. The body 39 may be a rigid and may fully support the vent valves and hold them in position within the fuel tank 10, if desired. The support 26 may have a separate inlet 42, 44 each associated with a separate one of the vent valves 22, 24, respectively, and at least one outlet 46 through which fuel vapor is routed from the main passage 40 to, for example, a vapor canister 28. The inlets 42, 44 may be defined at opposed ends of the support 26 and may include connection features 47 adapted to receive and retain outlet connectors or conduits 49 of the vent valves 22, 24. The outlet 46 may include one or more barbs 48 or other feature(s) adapted to receive a conduit 29 communicating the vent valves 22, 24 with the vapor canister 28. The support 26 may be rigid, and may couple the valves 22, 24 together. The support 26 may be carried by or held in position relative to the fuel tank 10, and may retain the position of the vent valves 22, 24 within the fuel tank. The vent valves 22, 24 may be spaced apart so that at least one vent valve 22, 24 is located on either side of the central saddle or barrier 12 of the tank 10. In other words, one vent valve 22, 24 may be located in each chamber 14, 16 of the tank 10. Accordingly, the support 26 may be long enough to span the saddle portion of the tank. The support may also be bent or contoured to locate the vent valves 22, 24 at a desired height relative to the tank and each other. The support 26 may include a mounting feature, such as a stem 50. In the implementation shown, the outlet 36 and stem 50 extend generally perpendicularly to the main passage 40, and in opposite directions, but other arrangements and implementations may be used. The stem 50 may be adapted to be coupled to a connector 52 and may include an outwardly extending flange 54 spaced from a free end 56 of the stem 50.

The connector 52 may be formed integrally with the fuel tank 10 (e.g. from the same piece of material as at least part of the tank) or it may be a separate component carried by or coupled to the fuel tank either while or after the tank is formed. When it is formed separately from the tank, the connector 52 may include a flange 58 adapted to be coupled to the tank 10 and a stem passage 62 in which the stem 50 of the support 26 is received, in assembly. The stem 50 and stem passage 62 may each be generally cylindrical and the stem may be rotatable relative to the connector 52 and about an axis 64 of the stem and stem passage. In this way, the vent valves 22, 24 may rotate or pivot about the stem 50. A retention feature may be provided on or carried by the connector 52 to retain the stem 50 within the stem passage 62. In the implementation shown, and as best shown in FIG. 2, the retention finger may include a finger 66 with a catch or hook 68. The finger 66 may also include a ramp 70 adapted to engage the flange 58 as the stem 50 is inserted into the stem passage 62, and the finger 66 may be flexible so that it may bend away from the axis 64 of the stem passage 62 as the ramp 70 passes over the flange 58. After the ramp 70 passes the flange 58, the resilient nature of the finger 66 causes it to return towards its unbent position wherein the hook 68 overlaps the flange 58 to retain the position of the support 26 relative to the connector 52 and prevent unintended removal of the stem 50 from the stem passage 62.

In the implementation shown, the support 26 is coupled to the tank 10 in the area of and above the saddle portion 12 of the tank 10, and the vent valves 22, 24 are located on opposite sides of the stem 50 and on opposite sides of a highest point of the saddle portion 12 of the tank 10. The highest point of the saddle portion 12 of the tank 10 defines the minimum fuel level at which fuel in the tank may flow into either chamber 14, 16 of the tank 10, or in other words, the highest barrier between the tank chambers.

The vent valves 22, 24 may be raised or lowered depending on the level of fuel within the tank chambers 14, 16, as shown in FIGS. 1, 3 and 4. FIG. 1 depicts a situation when the level of fuel is equal in each tank chamber 14, 16, and the tank 10 may be full (the tank 10 may be considered full when no further liquid fuel is to be added to the tank even though some interior volume of the tank may not be filled with fuel, as will be discussed further below). FIG. 3 depicts a situation when the level of fuel (denoted by line 75) in the chamber 16 shown on the right-hand side of that view is higher than the level of fuel (denoted by line 77) in the other tank chamber 14. And FIG. 4 depicts a situation when the level of fuel 77 in the chamber 14 shown on the left-hand side of that view is higher than the level of fuel 75 in the other tank chamber 16. Hence, the rotation or pivoted movement of the support 26 and valves 22, 24 about the stem 50 and relative to the tank 10 is shown in these different drawings. The rotation of the vent valves 22, 24 and support 26 is driven by liquid fuel acting on the vent valves as the level of fuel in either chamber reaches a level sufficient to displace the valves 22, 24.

Due to fuel sloshing, inclination of the vehicle (and hence, its fuel tank), the level of fuel in one chamber 14 or 16 of the tank 10 may be different from the other chamber 14 or 16. Also, fuel may primarily be pumped from one chamber (shown as chamber 16) to support engine operation, and/or fuel may also primarily be added to one chamber (e.g. chamber 16) of the tank 10 during refilling of the tank with liquid fuel. Therefore, in use, as fuel is pumped from the tank 10 or added into the tank, the level of fuel in the tank chambers 14, 16 may be uneven.

Some fuel tank systems include a siphon or transfer pump that transfers fuel from a secondary chamber (e.g. chamber 14) to a primary chamber (e.g. chamber 16) in which the main fuel pump is located. This may help even out differences in fuel level between different portions or chambers 14, 16 of a tank 10, or ensure that fuel in a secondary chamber 14 (where the main fuel pump is not located) is made available to the main fuel pump and engine. The transfer pump, in at least some implementations, may only be active when the main fuel pump is operating. Hence, when the vehicle is off and fuel is being added to the tank 10, the transfer pump might not operate and the level of fuel in the chambers 14, 16 of the tank 10 may be uneven.

During refilling of the fuel tank 10, liquid fuel is discharged from a refueling nozzle of a refueling station (i.e. "gas station") and into the fuel tank through a fill tube 72 (shown only in FIG. 1) connected to the fuel tank 10. The liquid fuel level rises within the tank 10 until the liquid fuel causes liquid actuated or responsive valves 38 (which may include a buoyant member or float) within the vent valves 22, 24 to close. Prior to the vent valves closing, gasses (fuel vapor, air) were displaced by the incoming fuel and vented from the tank 10 through the vent valves 22, 24. When the vent valves 22, 24 close, fuel vapor is no longer vented from the fuel tank 10 and the pressure within the fuel tank increases as still further fuel is added to the fuel tank. Fuel can be added to the fuel tank 10 until fuel backs up within the fill tube 72 and liquid fuel is sensed by a sensor on the refueling nozzle which shuts off the refueling nozzle to terminate the refilling event.

In some fuel tanks, due to the size and shape requirements of the fuel tank, one portion or chamber of the tank may be filled to a maximum level wherein its vent valve is closed by the liquid fuel in that chamber. This may occur, for example, where the height of the saddle portion is higher than the maximum fill level in a given portion of the tank so that fuel does not flow from one chamber to the other chamber over the saddle portion even when one chamber is full enough to close the vent valve. When this happens, because the vent valve is closed, it may be impossible to add additional fuel to the fuel tank, even though there is room for fuel in another chamber or portion of the tank.

This situation can be avoided by the pivoted support 26 and pivoted vent valves 22, 24 described herein. Because the vent valves 22, 24 can move within the chambers 14, 16 of the fuel tank 10, one of the vent valves 22, 24 can remain open even when the other vent valve is closed. This maintains a vent path for fuel vapor to be displaced from the fuel tank 10 so that additional fuel can be added to the fuel tank 10 without increasing the pressure within the tank 10 to the point that the refueling nozzle is shut off. For example, in FIG. 4, even though the chamber 14 shown on the left-hand side of that drawing may contain fuel at a level wherein the vent valve 22 would normally be closed, the vent valves 22, 24 and support 26 may rotate (clockwise as shown in this view) so that at least the vent valve 24 remains open. The opposite situation is shown in FIG. 3 wherein the vent valves 22, 24 and support 26 are rotated counterclockwise (compared to the orientation shown in FIG. 1) and the fuel level in the right-hand tank chamber 16 is full or nearly so while the left hand tank chamber 14 is not full. In this way, premature closing of the vent path from the fuel tank 10 may be avoided to permit fuel to be added to the fuel tank 10 even when one or more chambers of the fuel tank are full, but one or more other chambers are not. Rotation or pivoted movement of the support 26 and vent valves 22, 24 may be limited by engagement of either the support or valves with the fuel tank 10, or with one or more stop surfaces or other components within the fuel tank.

As shown in FIG. 5, alternate first and second vent valves 22', 24' may be defined by one or openings in a support 26'. For example, a first valve 22' may be defined by a first open end of the 26' and a second valve 24' may be defined by a second open end of the support 26'. The vent valves 22' and 24' are responsive to the level of liquid fuel in the tank at least because they are open when not immersed in liquid, and closed when immersed in liquid. Accordingly, the vent valves could comprise mechanical closures as discussed with regard to FIGS. 1-4, or more simply, openings closed by liquid (hydraulic closures) as shown in FIG. 5. The support 26' may be pivoted within the fuel tank, as discussed above with regard to the support 26 and provide a similar operation and functionality as discussed with regard to the devices shown in FIGS. 1-4. While the openings defining the first and second vent valves are shown as opening in the support, the support may include or be associated with vent tubes having the openings, such as open ends, that extend from or are otherwise carried by the support. The remainder of the system may be constructed as shown and described in FIGS. 1-4, with the same reference numbers applied to the same or similar components.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A venting system for a fuel tank, comprising:
a first vent valve through which fuel vapor may be vented from the fuel tank, being responsive to the level of liquid in the fuel tank to prevent fuel vapor in the fuel tank from venting through the first vent valve when the liquid fuel in the fuel tank causes the first vent valve to close, and being located within a first chamber of the fuel tank;
a second vent valve through which fuel vapor may be vented from the fuel tank, being responsive to the level of liquid in the fuel tank to prevent fuel vapor in the fuel tank from venting through the second vent valve when the liquid fuel in the fuel tank causes the second vent valve to close, and being located within a second chamber of the fuel tank that is separate from the first chamber of the fuel tank during at least certain fuel level conditions within the fuel tank; and
a support having a passage communicated with the first vent valve and the second vent valve that receives vapor that flows through the first vent valve and second vent valve, the support carrying both the first and second vent valves within the fuel tank and the support being movably carried within the fuel tank to vary the height of the first and second valves within the fuel tank.

2. The venting system of claim 1 wherein the support is pivotably connected to the fuel tank for pivoted movement of the support relative to the fuel tank about an axis, and as the support pivots one of the first and second vent valves is raised within the fuel tank and the other of the first and second vent valves is lowered within the fuel tank.

3. The venting system of claim 2 wherein the support pivots when liquid fuel acts on and displaces one of the vent valves with a greater force than is acting on the other vent valve.

4. The venting system of claim 1 which also includes a connector adapted to be carried by the tank and including a passage in which a portion of the support is received, the passage defining an axis about which the support rotates.

5. The venting system of claim 3 wherein the support is rigid and includes a stem about which the support pivots.

6. The venting system of claim 1 wherein at least one of the first vent valve or the second vent valve is defined by an opening in the support.

7. The venting system of claim 1 wherein the first vent valve includes a liquid actuated valve member that provides a mechanical closure when acted upon by liquid fuel.

8. The venting system of claim 1 wherein the second vent valve includes a liquid actuated valve member that provides a mechanical closure when acted upon by liquid fuel.

9. A fuel tank assembly, comprising:
a fuel tank having a first chamber, a second chamber and a tank wall separating the first chamber from the second chamber during at least certain levels of fuel within the fuel tank,
a first vent valve having an inlet through which fuel vapor may enter and an outlet through which fuel vapor may be vented from the fuel tank, and a liquid responsive valve that prevents fuel vapor from venting out of the outlet when the level of liquid fuel in the fuel tank causes the liquid responsive valve to close, the first vent valve being located within the first chamber of the fuel tank;
a second vent valve having an inlet through which fuel vapor may enter and an outlet through which fuel vapor may be vented from the fuel tank, and a liquid responsive valve that prevents fuel vapor from venting out of the outlet when the level of liquid fuel in the fuel tank causes the liquid responsive valve to close, the second vent valve being located within the second chamber of the fuel tank; and
a support having a first inlet communicated with the outlet of the first vent valve, a second inlet communicated with the outlet of the second vent valve and an outlet through which fuel vapor vented from the outlet of one or both of the first and second vent valves may flow, the support carrying both the first and second vent valves within the fuel tank and the support being movably carried within the fuel tank to vary the height of the first and second valves within the fuel tank.

10. The fuel tank assembly of claim 9 wherein the support is pivotably connected to the fuel tank for pivoted movement of the support relative to the fuel tank about an axis, and as the support pivots one of the first and second vent valves is raised within the fuel tank and the other of the first and second vent valves is lowered within the fuel tank.

11. The fuel tank assembly of claim 10 wherein the support pivots when liquid fuel acts on and displaces one of the vent valves with a greater force than is acting on the other vent valve.

12. The fuel tank assembly of claim 9 which also includes a connector adapted to be carried by the tank and including a passage in which a portion of the support is received, the passage defining an axis about which the support rotates.

13. The fuel tank assembly of claim 11 wherein the support is rigid and includes a stem about which the support pivots.

14. A venting system for a fuel tank, comprising:
a first vent valve having an inlet through which fuel vapor may enter and an outlet through which fuel vapor may be vented from the fuel tank, and a valve that prevents fuel vapor from venting out of the outlet when the level of liquid fuel in the fuel tank causes the valve to close, the first vent valve being located within a first chamber of the fuel tank;
a second vent valve having an inlet through which fuel vapor may enter and an outlet through which fuel vapor may be vented from the fuel tank, and a valve that prevents fuel vapor from venting out of the outlet when the level of liquid fuel in the fuel tank causes the valve to close, the second vent valve being located within a second chamber of the fuel tank that is separate from the first chamber of the fuel tank during at least certain fuel level conditions within the fuel tank; and
a support carrying both the first and second vent valves within the fuel tank and being carried within the fuel tank for pivoted movement relative to the fuel tank to vary the height of the first and second valves within the fuel tank as the support moves relative to the fuel tank.

15. The venting system of claim 14 wherein the support includes a main passage having one inlet communicating with the outlet of the first vent valve, a second inlet communicating with the outlet of the second vent valve and an outlet thorugh which fuel vapor from at least one of the first or second vent valve flows out of the main passage.

16. The venting system of claim 14 wherein the support is pivotably connected to the fuel tank for pivoted movement of the support relative to the fuel tank about an axis, and as the support pivots one of the first and second vent valves is raised within the fuel tank and the other of the first and second vent valves is lowered within the fuel tank.

17. The venting system of claim 16 wherein the support pivots when liquid fuel acts on and displaces one of the vent valves with a greater force than is acting on the other vent valve.

18. The venting system of claim 14 which also includes a connector adapted to be carried by the tank and including a passage in which a portion of the support is received, the passage defining an axis about which the support rotates.

19. The venting system of claim 17 wherein the support is rigid and includes a stem about which the support pivots.

* * * * *